(12) United States Patent
Tan

(10) Patent No.: US 11,981,180 B2
(45) Date of Patent: May 14, 2024

(54) THERMAL MANAGEMENT SYSTEM

(71) Applicant: Hangzhou Sanhua Research Institute Co., Ltd., Zhejiang (CN)

(72) Inventor: Yongxiang Tan, Zhejiang (CN)

(73) Assignee: Hangzhou Sanhua Research Institute Co., Ltd., Zhejiang (CN)

( * ) Notice: Subject to any disclaimer, the term of this patent is extended or adjusted under 35 U.S.C. 154(b) by 292 days.

(21) Appl. No.: 16/626,509

(22) PCT Filed: Jun. 22, 2018

(86) PCT No.: PCT/CN2018/092348
§ 371 (c)(1),
(2) Date: Dec. 24, 2019

(87) PCT Pub. No.: WO2019/001351
PCT Pub. Date: Jan. 3, 2019

(65) Prior Publication Data
US 2020/0240678 A1 Jul. 30, 2020

(30) Foreign Application Priority Data
Jun. 27, 2017 (CN) .......................... 201710499247.6

(51) Int. Cl.
*B60H 1/00* (2006.01)
*F25B 7/00* (2006.01)
(Continued)

(52) U.S. Cl.
CPC ........... *B60H 1/00278* (2013.01); *F25B 7/00* (2013.01); *F25B 13/00* (2013.01); *F25B 27/002* (2013.01);
(Continued)

(58) Field of Classification Search
CPC ............ B60H 1/00278; B60H 1/00885; B60H 1/143; B60H 1/3204; B60H 2001/00307;
(Continued)

(56) References Cited

U.S. PATENT DOCUMENTS

2009/0139472 A1* 6/2009 Gehres ...................... F01P 7/16
237/12.3 R
2010/0313582 A1 12/2010 Oh et al.
(Continued)

FOREIGN PATENT DOCUMENTS

CN 102927715 A 2/2013
CN 103604237 A 2/2014
(Continued)

OTHER PUBLICATIONS

Ono, Vehicle Refrigerant Circulation Device and Vehicle Air Conditioner, Feb. 18, 2015, JP2015093561A, Whole Document (Year: 2015).*
(Continued)

*Primary Examiner* — Larry L Furdge
(74) *Attorney, Agent, or Firm* — Wolf, Greenfield & Sacks, P.C.

(57) ABSTRACT

A thermal management system, the thermal management system including a refrigerant system, a first heat exchange system and a second heat exchange system. In a circulation mode of the thermal management system, the cooling liquid in the first heat exchange system and the second heat exchange system can be exchanged.

8 Claims, 4 Drawing Sheets

(51) Int. Cl.
    *F25B 13/00*         (2006.01)
    *F25B 27/00*         (2006.01)
    *F25B 41/20*         (2021.01)
    *F25B 41/24*         (2021.01)
    *F25B 41/39*         (2021.01)
    *F25B 49/02*         (2006.01)

(52) U.S. Cl.
    CPC .............. *F25B 41/20* (2021.01); *F25B 41/24* (2021.01); *F25B 41/39* (2021.01); *F25B 49/02* (2013.01); *F25B 2313/02741* (2013.01); *F25B 2600/25* (2013.01)

(58) Field of Classification Search
    CPC ........... B60H 2001/00935; B60H 2001/00957; F25B 7/00; F25B 13/00; F25B 27/002; F25B 41/20; F25B 41/24; F25B 41/39; F25B 49/02; F25B 2313/02741; F25B 27/00
    See application file for complete search history.

(56) References Cited

U.S. PATENT DOCUMENTS

| | | | |
|---|---|---|---|
| 2014/0116072 A1 | 5/2014 | Kim et al. | |
| 2015/0216689 A1* | 8/2015 | Kamel | A61B 17/00234 623/1.12 |
| 2015/0251518 A1* | 9/2015 | Nemesh | B60H 1/3208 62/238.7 |
| 2015/0308326 A1* | 10/2015 | Davies | F01P 11/029 137/2 |
| 2016/0339767 A1 | 11/2016 | Enomoto et al. | |

FOREIGN PATENT DOCUMENTS

| | | | |
|---|---|---|---|
| CN | 103791650 A | | 5/2014 |
| CN | 105356003 A | | 2/2016 |
| CN | 105980793 A | | 9/2016 |
| CN | 205718042 U | | 11/2016 |
| DE | 11 2015 000 552 T5 | | 11/2016 |
| EP | 2 916 082 A1 | | 9/2015 |
| FR | 3 027 557 A1 | | 4/2016 |
| JP | H08-303898 A | | 11/1996 |
| JP | 2015093561 A | * | 5/2015 |
| WO | WO 2015/122137 A1 | | 8/2015 |

OTHER PUBLICATIONS

Extended European Search Report for European Application No. 18823682.2, dated Feb. 15, 2021.
First Office Action for Chinese Application No. 201710499247.6, dated Jan. 20, 2020.
International Search Report and Written Opinion for International Application No. PCT/CN2018/092348, dated Sep. 3, 2018.

* cited by examiner

THERMAL MANAGEMENT SYSTEM

RELATED APPLICATIONS

The present application is the national phase of International Patent Application No. PCT/CN2018/092348, titled "THERMAL MANAGEMENT SYSTEM", filed on Jun. 22, 2018, which claims the priority to Chinese Patent Application No. 201710499247.6, titled "THERMAL MANAGEMENT SYSTEM", filed on Jun. 27, 2017 with the China National Intellectual Property Administration, both of which are incorporated herein by reference in their entireties.

FIELD

The present application relates to the technical field of thermal management systems.

BACKGROUND

In some cases, such as a low outdoor temperature, the heating capacity of the thermal management system cannot meet the heating requirement, while the heat generated during operation by equipment such as batteries cannot be effectively utilized. In another case, the heating capacity of the thermal management system is excessive, while the equipment such as batteries require heat to operate within a normal temperature range. Therefore, it is necessary to improve the existing technology to solve the above technical problems.

SUMMARY

An object of the present application is to provide a thermal management system, which is beneficial to reducing the energy loss of the thermal management system.

In order to achieve the above object, the following technical solution is adopted:

a thermal management system includes a refrigerant system, a first heat exchange system and a second heat exchange system, the thermal management system includes a first heat exchanger, a second heat exchanger and a third heat exchanger, both the first heat exchanger and the second heat exchanger include two flow channels, the two flow channels of the first heat exchanger are isolated from each other and are not in communication with each other, the two flow channels of the second heat exchanger are isolated from each other and are not in communication with each other, the refrigerant system includes a first flow channel of the first heat exchanger and a first flow channel of the second heat exchanger, the first heat exchange system includes a fourth heat exchanger and a second flow channel of the first heat exchanger, the second flow channel of the first heat exchanger is in communication with the fourth heat exchanger, and the first heat exchange system can exchange heat with the refrigerant system at the first heat exchanger; the second heat exchange system includes a second flow channel of the second exchanger and a fifth heat exchanger, the second flow channel of the second heat exchanger is in communication with the fifth heat exchanger, and the second heat exchange system can exchange heat with the refrigerant system at the second heat exchanger;

the thermal management system further includes a first communication pipeline and a second communication pipeline, the first heat exchange system can communicate with the second heat exchange system through the first communication pipeline and the second communication pipeline, and the thermal management system can operate in a circulation mode in which a portion of the coolant of the first heat exchange system can flow into the second heat exchange system and be mixed with the coolant of the second heat exchanger system, and the mixed coolant of the second heat exchange system can flow into the first heat exchange system; and the thermal management system further comprises an air conditioning box, the fourth heat exchanger is arranged inside the air conditioning box, and the fifth heat exchanger is arranged outside the air conditioning box.

The present application realizes the coolant exchange between the first heat exchange system and the second heat exchange system by communicating the first heat exchange system with the second heat exchange system, which is beneficial to reducing the energy loss of the thermal management system.

DETAILED DESCRIPTION OF THE EMBODIMENTS

Figure 1:
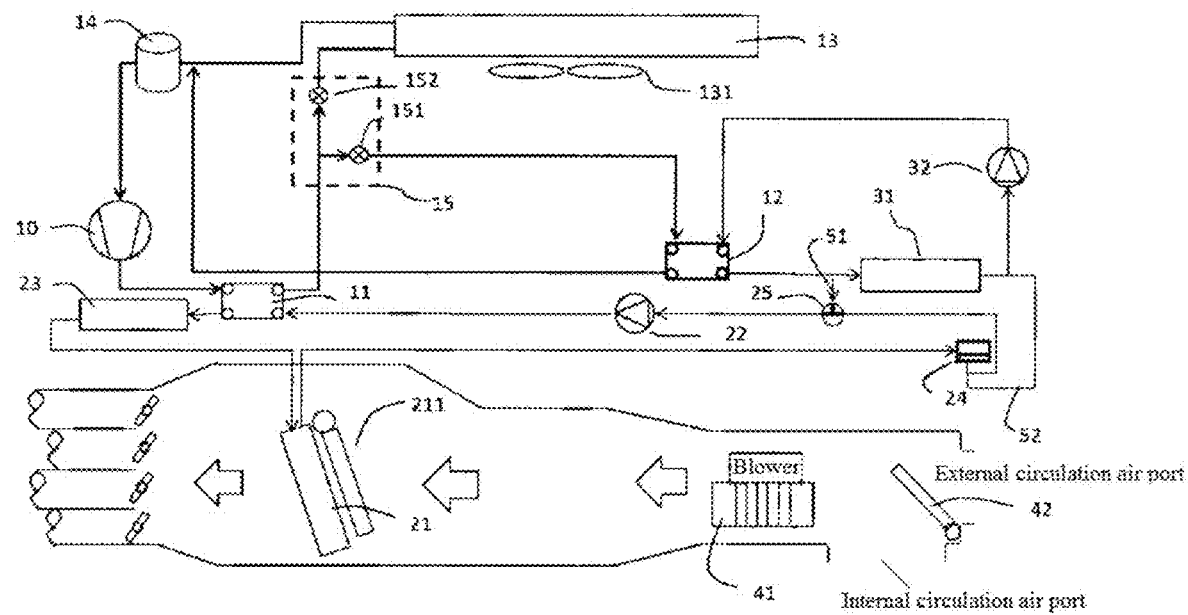
FIG. 1 is a schematic view of a first embodiment of a thermal management system.

A thermal management system according to the technical solution of the present application has a variety of embodiments, at least one embodiment can be applied to a vehicle thermal management system, and at least one embodiment can be applied to other thermal management systems such as a home thermal management system or a commercial thermal management system. A vehicle thermal management system is particularly described with reference to the drawings hereinafter.

Referring to FIGS. 1 to 7, the thermal management system includes a refrigerant system, a first heat exchange system and a second heat exchange system. A refrigerant of the refrigerant system is isolated from a coolant of the first heat exchange system and does not circulate, and the refrigerant of the refrigerant system is isolated from a coolant of the second heat exchange system and does not circulate. The thermal management system includes a first heat exchanger 11, a second heat exchanger 12, and a third heat exchanger 13. Both the first heat exchanger 11 and the second heat exchanger 12 include a first flow channel and a second flow channel. The first flow channel is a channel for the refrigerant, and the second flow channel is a channel for the coolant. The first flow channel is isolated from the second flow channel, and does not communicate with the second flow channel. When the thermal management system is working, the refrigerant flowing through the first flow channel can exchange heat with the coolant flowing through the second flow channel.

The refrigerant system includes a compressor 10, a first valve device 15, the first flow channel of the first heat exchanger 11, the first flow channel of the second heat exchanger 12 and the third heat exchanger 13. The first valve device 15 includes a first port, a second port and a third port. The first port of the first valve device 15 can communicate with the second port of the first valve device 15 and/or the third port of the first valve device 15. The second port of the first valve device 15 can communicate with the first port of the first valve device 15 and/or the third port of the first valve device 15. A refrigerant outlet of the first flow channel of the first heat exchanger 11 can communicate with the second port of the first valve device 15, a first port of the third heat exchanger 13 can communicate with the first port of the first valve device 15, and a refrigerant inlet of the first flow channel of the second heat exchanger 12 can communicate with the third port of the first valve device 15. The refrigerant outlet of the first flow channel of the first heat exchanger 11 can communicate with the first port of the third heat exchanger 13 and/or the refrigerant inlet of the first flow channel of the second heat exchanger 12 through the first valve device 15. A second port of the third heat exchanger 13 is in communication with a suction port of the compressor 10, and a refrigerant outlet of the first flow channel of the second heat exchanger 12 is in communication with the suction port of the compressor 10.

Referring to FIG. 1, the first valve device 15 includes a first throttle device 152 and a second throttle device 151. A second connection port of the first throttle device 152 and a second connection port of the second throttle device 151 are both in communication with the second port of the first valve device 15. A first connection port of the second throttle device 151 is in communication with the third port of the first valve device 15. The first connection port of the second throttle device 151 is also in communication with the first port of the first valve device 15. The refrigerant can flow into the first valve device 15 from the second port of the first valve device 15. A portion of the refrigerant flows into the first port of the first valve device 15 after being throttled by the first throttle device 152, and another portion of the refrigerant flows into the third port of the first valve device 15 after being throttled by the second throttle device 151.

In other technical solutions of the present application, the first valve device 15 may include the first throttle device 152, a first valve unit 153 and a second valve unit 154. Both the first valve unit 153 and the second valve unit 154 include the first connection port and the second connection port. The second port of the first valve device 15 is in communication with the second connection port of the first throttle device 152. The first connection port of the first throttle device 152 is in communication with the first connection port of the first valve unit 153 and the first connection port of the second valve unit 154. The second connection port of the first valve unit 153 is in communication with the first port of the first valve device 15. The second connection port of the second valve unit 154 is in communication with the third port of the first valve device 15. Alternatively, the first valve unit and the second valve unit may be replaced by a third valve unit which includes three connection ports.

Specifically, the second connection port of the first throttle device 152 is in communication with the second port of the first valve device 15, and the second connection port of the first throttle device 152 is in communication with the first connection port of the third valve unit. A third connection port of the third valve unit is in communication with the third port of the first valve device 15, and the second connection port of the third valve unit is in communication with the first port of the first valve device 15. In addition, the first valve device 15 may include the first throttle device 152, the second throttle device 151, the first valve unit 153, and the second valve unit 154. The second connection port of the first throttle device 152 and the first connection port of the second valve unit 154 can communicate with the second port of the first valve device 15. The first connection port of the first throttle device 152 and the first connection port of the first valve unit 153 can communicate with the first port of the first valve device 15. The second connection port of the first valve unit 153 and the second connection port of the second valve unit 154 can communicate with the first connection port of the second throttle device 151. The second connection port of the second throttle device 151 is in communication with the third port of the first valve device 15. In other embodiments, the thermal management system includes the first throttle device 152, the second throttle device 151 and the third valve unit, and the third valve unit includes three connection ports. The second connection port of the first throttle device 152 and the second connection port of the third valve unit are both in communication with the second port of the first valve device 15. The first connection port of the first throttle device 152 and the first connection port of the third valve unit are both in communication with the first port of the first valve device 15. The third connection port of the third valve unit is in communication with the first connection port of the second throttle device 151, and the second connection port of the second throttle device 151 is in communication with the third port of the first valve device 15.

The first valve unit and the second valve unit may be a stop valve or a flow regulating valve, and the third valve unit may be a three-way flow regulating valve or a three-way switching valve. The first valve device is provided with the stop valve or the flow regulating valve or the three-way switching valve or the three-way flow regulating valve, which is beneficial to the control of the thermal management system.

In other embodiments of the present technical solution, the first valve unit 153 may be a first one-way valve, and the second valve unit 154 may be a second one-way valve. Specifically, the second connection port of the first throttle device 152 is in communication with the second port, the first connection port of the first throttle device 152 can communicate with the first port, an inlet of the first one-way valve 153 can communicate with the first port of the first valve device, an inlet of the second one-way valve 154 can communicate with the second port, an outlet of the first one-way valve 153 can communicate with the first connection port of the second throttle device 151, an outlet of the second one-way valve 154 can communicate with the first connection port of the second throttle device 151, and the second connection port of the second throttle device 151 is in communication with the third port. When the refrigerant flows in from the first port, a portion of the refrigerant flows into the second throttle device 151 through the first one-way valve 153 and then flows into the third port after being throttled by the second throttle device 151, and another portion of the refrigerant flows into the second port after being throttled by the first throttle device 152. Because of the throttling of the first throttle device 152, the pressure of the refrigerant at the second port is less than the pressure at the outlet of the second one-way valve 154, and thus the second one-way valve 154 is in a one-way shut-off state.

Similarly, when the refrigerant flows in from the second port, the first one-way valve 153 is in a one-way shut-off state. In the technical solution of the present application, the first valve unit 153 and/or the second valve unit 154 adopts the one-way valve, which is relatively low in cost and does not require control.

The refrigerant may be in a liquid state or a gas-liquid two-phase state during operation, and the thermal management system may be provided with a gas-liquid separator 14. The refrigerant in the gas-liquid two-phase state is separated by the gas-liquid separator 14, the liquid refrigerant is stored in the gas-liquid separator 14, while the refrigerant with a low temperature and a low pressure enters the compressor 10 and is compressed into the refrigerant with a high temperature and a high pressure by the compressor 10, and the process cycles in such a way. Besides, in a case that the compressor 10 can withstand the liquid refrigerant, the gas-liquid separator may not be provided, and the gas-liquid separator may also be replaced by a liquid reservoir. If the refrigerant does not have the two-phase state during operation, the gas-liquid separator may not be provided.

Figure 2:
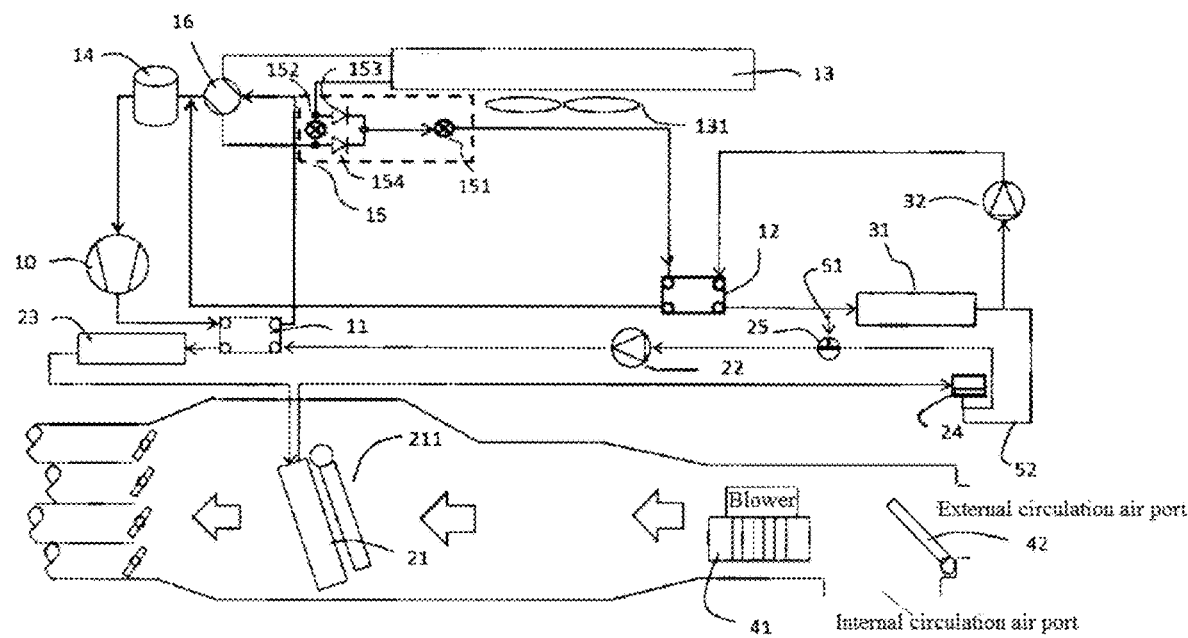
FIG. 2 is a schematic view of a second embodiment of the thermal management system.
Figure 3:
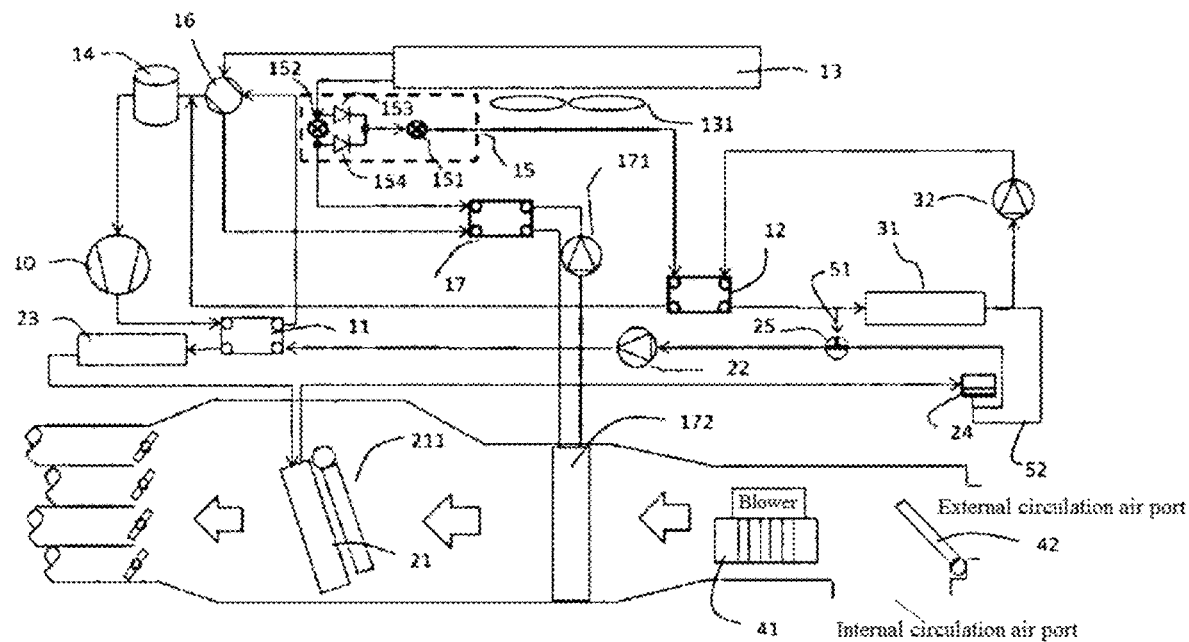
FIG. 3 is a schematic view of a third embodiment of the thermal management system.

Referring to FIGS. 1 to 3, the first heat exchange system includes the second flow channel of the first heat exchanger 11, a fourth heat exchanger 21 and a first pump 22. The second flow channel of the first heat exchanger 11 and the fourth heat exchanger 21 are in communication with the first pump 22, and the coolant in the first heat exchange system is driven by the first pump 22 to flow. Therefore, due to the drive of the first pump 22, the second flow channel of the first heat exchanger 11, the fourth heat exchanger 21 and the first pump 22 all have outlets and inlets for the coolant, or in other words, the outlets and inlets for the coolant of the second flow channel of the first heat exchanger 11, the fourth heat exchanger 21 and the first pump 22 are related to the first pump 22. If a flow direction of the coolant changes due to the drive of the first pump 22, the outlets and inlets for the coolant of the second flow channel of the first heat exchanger 11, the fourth heat exchanger 21, and the first pump 22 also change accordingly. The second heat exchange system is similar to the first heat exchange system and is not described. The second heat exchange system includes the second flow channel of the second heat exchanger 12, a fifth heat exchanger 31 and a second pump 32, the second flow channel of the second heat exchanger 12 and the fifth heat exchanger 31 are in communication with the second pump 32, and the coolant in the second heat exchange system is driven by the second pump 32 to flow. The fifth heat exchanger 31 may be a temperature controller of a device such as a battery, and is configured to heat or cool the device such as a battery, or the fifth heat exchanger 31 can absorb heat released by the device such as a battery or release heat to the device such as a battery. The device such as a battery includes, but is not limited to, a battery, a motor, an electronic device and so on.

Referring to FIGS. 1 to 3, the thermal management system further includes a first communication pipeline 51 and a second communication pipeline 52. The first communication pipeline 51 and the second communication pipeline 52 both include two connection ports, and a first connection port of the first communication pipeline 51 is in communication with the first heat exchange system, that is, the first connection port of the first communication pipeline 51 is in communication with the first heat exchange system through the pipeline communication in the first heat exchange system, or the first connection port of the first communication pipeline 51 is in communication with the first heat exchange system through the second flow channel of the first heat exchanger 11 or the fourth heat exchanger 21 or the first pump 22, and a second connection port of the first communication pipeline 51 is in communication with the second heat exchange system. Similarly, the first connection port of the second communication pipeline 52 is in communication with the first heat exchange system, and the second connection port of the second communication pipeline 52 is in communication with the second heat exchange system. Specifically, the second connection port of the second communication pipeline 52 is in communication with the second heat exchange system through the pipeline communication in the second heat exchange system, or the second connection port of the second communication pipeline 52 is in communication with the second heat exchange system through the second flow channel of the second heat exchanger 12 or the fifth heat exchanger 31 or the second pump 32. The thermal management system can realize the exchange of the coolant in the first heat exchange system and the coolant in the second heat exchange system through the first communication pipeline 51 and the second communication pipeline 52, that is, the coolant in the first heat exchange system can flow into the second heat exchange system through the first communication pipeline 51 or the second communication pipeline 52, or, the coolant in the second heat exchange system can flow into the first heat exchange system through the first communication pipeline 51 or the second communication pipeline 52, and the heat exchange between the first heat exchange system and the second heat exchange system is finally realized. Specifically, the first connection port of the first communication pipeline 51 is in communication with an inlet of the first pump 22, or the first connection port of the second communication pipeline 52 is in communication with an inlet of the second pump 32. For example, the first connection port of the first communication pipeline 51 is in communication with the inlet of the first pump 22, the second connection port of the first communication pipeline 51 is in communication with the second heat exchange system, and the two connection ports of the second communication pipeline 52 are in communication with the first heat exchange system and the second heat exchange system, respectively; or the first connection port of the first communication pipeline 51 is in communication with the first heat exchange system through the first pump 22, and the second connection port of the second communication pipeline 52 is in communication with the second heat exchange system through the second pump 32, to ensure that the coolant in the first heat exchange system can enter the second heat exchange system, or ensure that the coolant in the second heat exchange system can enter the first heat exchange system. If to realize the exchange between the coolant in first heat exchange system and the coolant in the second heat exchange system, the thermal management system may only include the first pump 22 or only include the second pump 32, or the thermal management system may include both the first pump 22 and the second pump 32, but only the first pump 22 or only the second pump 32 is turned on while the thermal management system is in operation. Besides, in a case that the first heat exchange system and the second heat exchange system operate independently, both the first heat exchange system and the second heat exchange system should be provided with a pump.

The thermal management system further includes a first valve member 25, the first valve member 25 includes two ports. The first valve member 25 can open or close a communication passage between the first port of the first valve member 25 and the second port of the first valve member 25. The first port of the first valve member 25 is in communication with the first communication pipeline 51, the second port of the first valve member 25 is in communication with the inlet of the first pump 22, or the second port of the first valve member 25 is in communication with the pipelines of the second heat exchange system. The thermal management system can control the communication between the first heat exchange system and the second heat exchange system through the first valve member 25. Specifically, a coolant outlet of the second flow channel of the first heat exchanger 11 is in communication with one port of the fourth heat exchanger 21, another port of the fourth heat exchanger 21 is in communication with the inlet of the first pump 22, and the outlet of the first pump 22 is in communication with the refrigerant inlet of the second flow channel of the first heat exchanger 11. Similarly, a coolant outlet of the second flow channel of the second heat exchanger 12 is in communication with one port of the fifth heat exchanger 31, another port of the fifth heat exchanger 31 is in communication with the inlet of the second pump 32, and the outlet of the second pump 32 is in communication with the coolant inlet of the second flow channel of the second heat exchanger 12. More specifically, the first connection port of the first communication pipeline 51 is in communication with the first port of the first valve member 25, the second port of the first valve member 25 is in communication with the inlet of the first pump 22, and the second connection port of the first communication pipeline 51 is communication with a pipeline between the outlet of the second flow channel of the second heat exchanger 12 and the fifth heat exchanger 31; or the first connection port of the first communication pipeline 51 is in communication with the inlet of the first pump 22, the second connection port of the first communication pipeline 51 is in communication with the first port of the first valve member 25, and the second port of the first valve member 25 is in communication with the pipeline between the outlet of the second flow channel of the second heat exchanger 12 and the fifth heat exchanger 31. The thermal management system may also adjust the amount of the coolant exchanged between the first heat exchange system and the second heat exchange system by controlling the first valve member 25, for example, the first valve member 25 includes three ports, the first valve member 25 can open or close the communication passage between the first port and the third port, and/or the first valve member 25 can open or close the communication passage between the first port and the second port, the first port of the first valve member 25 is in communication with the first communication pipeline 51, the third port of the first valve member 25 is in communication with a pipeline in front of the inlet of the first pump 22, and the second port of the first valve member 25 is communication with the inlet of the first pump 22. The first connection port of the second communication pipeline 52 is in communication with other communication pipelines of the first heat exchange system other than the inlet of the first pump 22, such as the outlet or the inlet of the fourth heat exchanger 21. The second connection port of the second communication pipeline 52 is in communication with the pipeline between the outlet of the fifth heat exchanger 31 and the inlet of the second pump 32, or the second connection port of the second communication pipeline 52 is in communication with the pipeline between the inlet of the second flow channel of the second heat exchanger 12 and the outlet of the second pump 32, or the second connection port of the second communication pipeline 52 is in communication with the inlet of the second pump 32. Similarly, the thermal management system may also be provided with a second valve member (not shown), the second valve member is in communication with the first connection port or the second connection port of the second communication pipeline 52. The thermal management system controls whether the second communication pipeline 52 is in communication with the first heat exchange system and the second heat exchange system by controlling the second valve member, and the second valve member is arranged in the same manner as the first valve member 25 and is not described again. The first valve member 25 and/or the second valve member may be a three-way switching valve or a three-way proportional valve or a stop valve or a proportional valve. When the thermal management system is in operation, if the coolant in the first heat exchange system and the coolant in the second heat exchange system need to be exchanged, the thermal management system can open the first valve member 25 and/or the second valve member, and concurrently turns on the first pump 22 and/or the second pump 32, to achieve the exchange of the coolant.

The thermal management system further includes a kettle 24 arranged at a highest point of the first heat exchange system and the second heat exchange system. The first heat exchange system and the second heat exchange system can remove bubbles in the coolant through the kettle 24. The kettle 24 at least includes one connection port, the first heat exchange system and the second heat exchange system are in communication with the first connection port of the kettle 24 through the pipelines, and the function of the kettle 24 in such a case is to remove bubbles. The kettle 24 may include two connection ports, and the first connection port is higher than the second connection port. In the technical solution of the present application, the kettle 24 is a part of a flow channel of a coolant system, and the coolant outlet of the fourth heat exchanger 21 is in communication with the first connection port of the kettle 24, and the second connection port of the kettle 24 is in communication with the inlet of the first pump 22. In this case, the two connection ports of the kettle 24 are in communication with the first heat exchange system. The second connection port of the kettle 24 is in communication with the pipeline between the fifth heat exchanger 31 and the inlet of the second pump 32 through the second communication pipeline 52, that is, the first connection port of the second communication pipeline 52 is in communication with the second connection port of the kettle 24, and the second connection port of the second communication pipeline 52 is in communication with the pipeline between the fifth heat exchanger 31 and the inlet of the second pump 32. In this case, the kettle 24 is in communication with the first heat exchange system and can participate in the coolant flow in the first heat exchange system. When the first valve member 25 is opened, the kettle 24 can also participate in the coolant flow in the second heat exchange system.

The thermal management system further includes a heating device 23. The heating device 23 includes two ports and a coolant flow channel communicating the two ports, and further includes a heating core which can heat the coolant flowing through the heating device 23. The heating device 23 may be an electric heating device or a heating device in other forms. The heating device 23 is arranged in the first heat exchange system. The heating device 23, the first pump 22 and the second flow channel of the first heat exchanger 11 are in communication with the fourth heat exchanger 21. Specifically, along a flow direction of the coolant in the first heat exchange system, the heating device 23 can be arranged between the coolant outlet of the second flow channel of the first heat exchanger 11 and the coolant inlet of the fourth heat exchanger 21. The heating device 23 can reheat the coolant, and then the coolant in the first heat exchanger system can exchange heat with the air around the fourth heat exchanger 21 at the fourth heat exchanger 21.

The thermal management system includes an air conditioning box. The air conditioning box includes an air conditioning box body, a number of air ducts (not shown) communicating with the vehicle interior is provided at one end of the air conditioning box body, and the air duct is provided with a grille (not shown) capable of adjusting the size of the air duct. An internal circulation air port, an external circulation air port, and a circulation damper 42 for adjusting the size of the internal circulation air port and the external circulation air port are provided on a side of the air conditioning box where the air comes in. The internal circulation air port is in communication with a passenger compartment, and the air in the passenger compartment enters the air conditioning box through the internal circulation air port, and then re-enters the passenger compartment through the air ducts, forming an internal circulation. The external circulation air port is in communication with the outside, and the outside air enters the air conditioning box through the external circulation air port and enters the passenger compartment through the air ducts. The circulation damper 42 is arranged between the internal circulation air port and the external circulation air port, and controls the switching between the internal circulation air port and the external circulation air port. When the circulation damper 42 is switched to the internal circulation air port, the internal circulation air port can be closed. When the circulation damper 42 is switched to the external circulation air port, the external circulation air port can be closed to form an internal circulation. A position of the circulation damper 42 can adjust the size of the internal circulation air port and the external circulation air port, thereby adjusting the proportion of the air outside the vehicle to the air inside the vehicle in the air entering the air conditioning box. A blower 41 is arranged at a position close to the internal circulation air port and the external circulation air port in the air conditioning box. The fourth heat exchanger 21 is located in the air duct of the air conditioning box body, and a temperature damper 211 is further arranged at the fourth heat exchanger 21. When the temperature damper 211 is open, the air coming in from the internal circulation air port or the external circulation air port can flow through the fourth heat exchanger 21 or part of the fourth heat exchanger 21 behind the temperature damper 211. When the temperature damper 211 is closed, the air coming in from the internal circulation air port or the external circulation air port cannot flow through the fourth heat exchanger 21, the air flows through the channels on two sides of the temperature damper 211 and then enters the passenger compartment through the air duct. The fifth heat exchanger 31 is used for heat exchange of equipment such as the battery, so the fifth heat exchanger 31 is generally arranged outside the air conditioning box. The heating device 23 is also arranged outside the air conditioning box, which is beneficial to reducing the wind resistance of the airflow in the air conditioning box.

Figure 4:
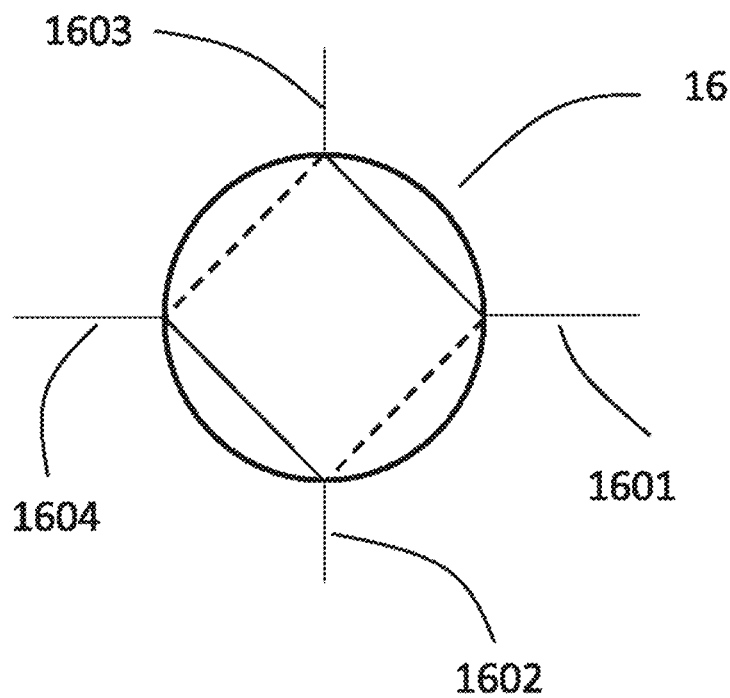
FIG. 4 is a schematic view of a second valve device shown in FIG. 3 in a first working state.

Referring to FIG. 4, the thermal management system further includes a second valve device 16, which includes a first communication port 1601, a second communication port 1602, a third communication port 1603, and a fourth communication port 1604. The second valve device 16 can be connected with the thermal management system in the following manner, the first communication port 1601 is in communication with the refrigerant outlet of the first flow channel of the first heat exchanger 11, the fourth communication port 1604 is in communication with the suction port of the compressor 10 or is in communication with the suction port of the compressor 10 through the gas-liquid separator 14, the second communication port 1602 is in communication with the second port, and the third communication port 1603 is in communication with the second port of the third heat exchanger 13. The second valve device 16 has a first working state and a second working state. In the first working state of the second valve device 16, the second valve device 16 opens a communication channel between the first communication port 1601 and the third communication port 1603, and opens a communication channel between the fourth communication port 1604 and the second communication port 1602. In the second working state of the second valve device 16, the second valve device 16 opens a communication channel between the first communication port 1601 and the second communication port 1602, and opens a communication channel between the third communication port 1603 and the fourth communication port 1604. More specifically, the second valve device 16 of the thermal management system can be a multi-way control valve which includes a first valve opening, a second valve opening, a third valve opening and a first inlet, the first inlet is in communication with the first communication port 1601, the first valve opening is in communication with the third communication port 1603, the second valve opening is in communication with the fourth communication port 1604, and the third valve opening is in communication with the second communication port 1602. In the first working state of the second valve device 16, the multi-way control valve can open a communication channel between the first inlet and the first valve opening, and open a communication channel between the third valve opening and the second valve opening. In the second working state of the second valve device 16, the multi-way control valve can open a communication channel between the first valve opening and the second valve opening, and open a communication channel between the third valve opening and the first inlet.

Figure 5:
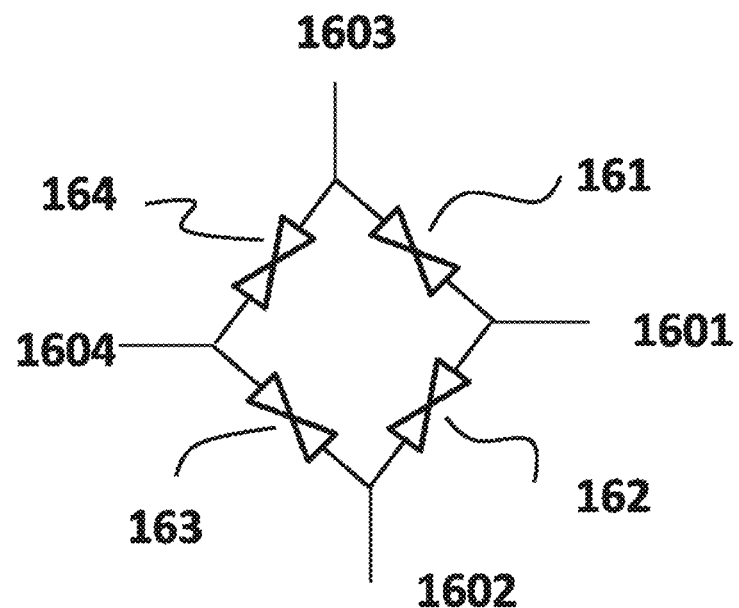
FIG. 5 is another schematic view of the second valve device.
Figure 6:
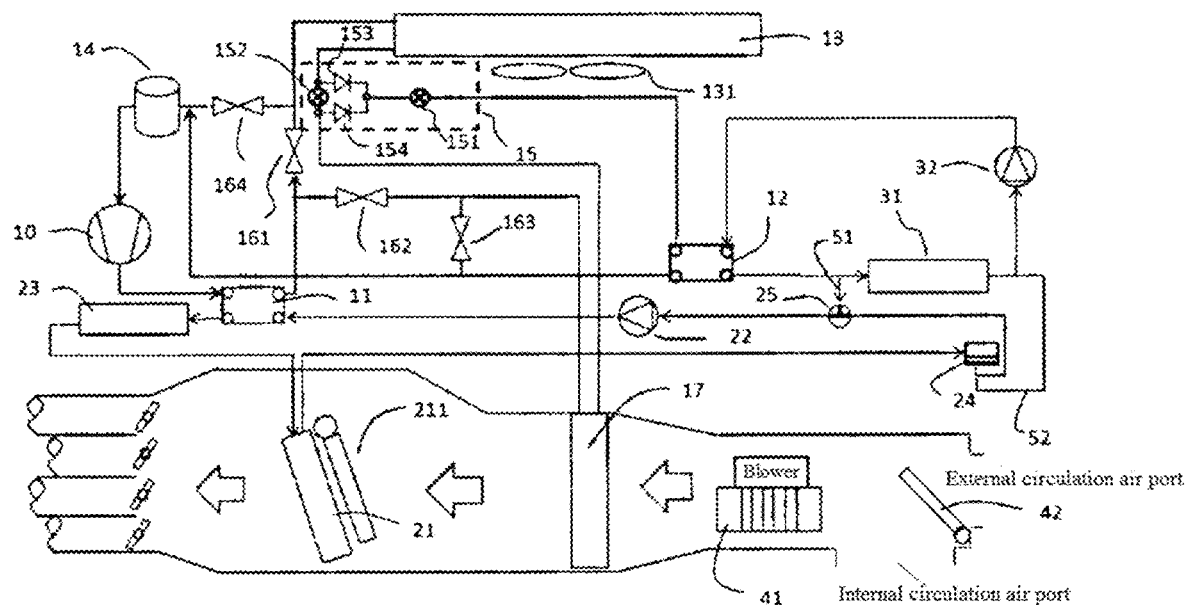
FIG. 6 is a schematic view of a fourth embodiment of the thermal management system.

Referring to FIGS. 5 and 6, another embodiment of the thermal management system is illustrated. Only the differences from the above embodiments are described here. Compared with the first embodiment, the second valve device 16 includes a first valve module 161, a second valve module 162, a third valve module 163 and a fourth valve module 164. The first valve module 161, the second valve module 162, the third valve module 163 and the fourth valve module 164 may be stop valves or two-way flow regulating valves. A first connection port of the first valve module 161 and a first connection port of the second valve module 162 are both in communication with the first communication port 1601. A second connection port of the first valve module 161 and a second connection port of the fourth valve module 164 are both in communication with the third communication port 1603. A second connection port of the second valve module 162 and a second connection port of the third valve module 164 are in communication with the second communication port 1602. A first connection port of the third valve module 163 and a first connection port of the fourth valve module 164 are both in communication with the fourth communication port 1604. In the first working state of the second valve device 16, the second valve module 162 and the fourth valve module 164 are shut off, and the first valve module 161 and the third valve module 163 are opened. In the second working state of the second valve device 16, the first valve module 161 and the third valve module 163 are shut off, and the second valve module 162 and the fourth valve module 164 are opened.

In other technical solutions of the present application, the first valve module 161 and the second valve module 162 may be replaced by a three-way switching valve or a three-way flow regulating valve (not shown). Specifically, a first port of the three-way switching valve is in communication with the first communication port 1601, a second port of the three-way switching valve and the second connection port of the third valve module 163 are both in communication with the third communication port 1603, and a third port of the three-way switching valve and a second port of the fourth valve module 164 are in communication with the second communication port 1602. In the first working state of the second valve device 16, the second valve device 16 opens a communication channel between the first port of the three-way switching valve and the third port of the three-way switching valve, closes a communication channel between the first port of the three-way switching valve and the third port of the three-way switching valve, closes the fourth valve module and opens the third valve module. In the second working state of the second valve device 16, the three-way switching valve closes the communication channel between the first port and the third port, closes the third valve module 163, opens the communication passage between the first port of the three-way switching valve and the second port of the three-way switching valve, and opens the fourth valve module 164. Similarly, the second valve module 162 and the third valve module 163, the third valve module 163 and the fourth valve module 164, the fourth valve module 164 and the first valve module 161 may all be replaced by three-way switching valves or three-way flow regulating valves, which is not described in detail again.

When the thermal management system controls the second valve device 16 to be in the first working state, the refrigerant flows into the second valve device 16 from the first communication port 1601, then flows out of the second valve device 16 from the third communication port 1603, and then flows into the third heat exchanger 13. The refrigerant then flows into the first port of the first valve device 15 from the third heat exchanger 13, which can turn on the first throttle device 152 and/or the second throttle device 151. If both the first throttle device 152 and the second throttle device 151 are turned on, one portion of the refrigerant flows into the second throttle device 151 through the first valve unit 153, and another portion of the refrigerant flows out through the second port of the first valve device 15 after being throttled by the first throttle device 152. Because of the throttle of the second throttle device 151, the pressure of the refrigerant at the second port is less than the pressure at the outlet of the second valve unit 154. Therefore, in a case that the second valve unit 154 is the one-way valve, the refrigerant at the second port of the first valve device 15 cannot flow to the first throttle device 152 through the second valve unit 154. Similarly, when the thermal management system controls the second valve device 16 to be in the second working state, the refrigerant flows into the second valve device 16 from the first communication port 1601, then flows out of the second valve device 16 from the second communication port 1602, and then flows into the second port of the first valve device 15, which can turns on the first throttle device 152 and/or the second throttle device 151. If both the first throttle device 152 and the second throttle device 151 are turned on, one portion of the refrigerant flows into the second throttle device 151 through the second valve unit 154, and another portion of the refrigerant flows out through the first port of the first valve device 15 after being throttled by the first throttle device 152. Because of the throttle of the first throttle device 152, the pressure of the refrigerant at the first port is less than the pressure at the outlet of the first valve unit 153. Therefore, in a case that the first valve unit 153 is the one-way valve, the refrigerant at the first port of the first valve device 15 cannot flow to the first throttle device 152 through the first valve unit 154.

Figure 7:
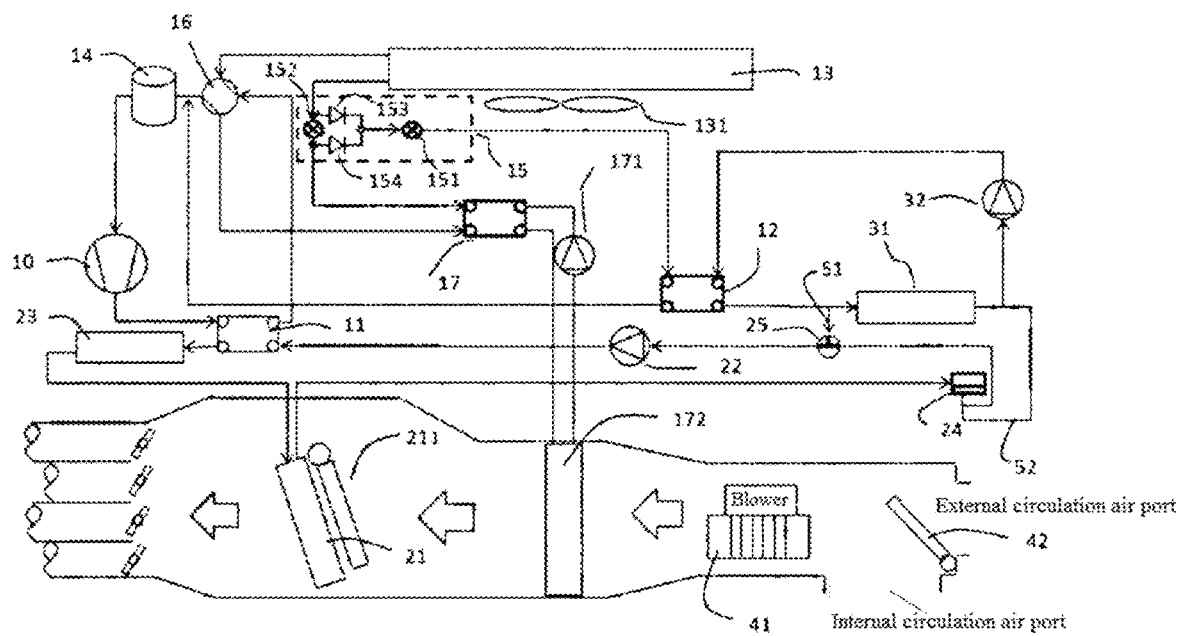
FIG. 7 is a schematic view of a fifth embodiment of the thermal management system.

Referring to FIGS. 3, 6 and 7, the thermal management system further includes a sixth heat exchanger 17, which is arranged in the air conditioner box. The sixth heat exchanger 17 is arranged at an upwind position with reference to the fourth heat exchanger 21, or in other words, the airflow in the air duct is blown to the fourth heat exchanger 21 after flowing through the sixth heat exchanger 17. One port of the sixth heat exchanger 17 is in communication with the second communication port 1602 of the second valve device 16, and another port of the sixth heat exchanger 17 is in communication with the second port of the first valve device 15. As shown in the drawings, the thermal management system may further include a third heat exchange system. Referring to FIG. 7, the sixth heat exchanger 17 is a dual-channel heat exchanger, and the third heat transfer system further includes a second flow channel of the sixth heat exchanger 17, a third pump 171 and a seventh heat exchanger 172. A refrigerant inlet of a first flow channel of the sixth heat exchanger 17 is in communication with the second communication port 1602, a refrigerant outlet of the first flow channel of the sixth heat exchanger 17 is in communication with the second port of the first valve device 15, and the second flow channel of the sixth heat exchanger 17 and the third pump 171 are in communication with the seventh heat exchanger 172. The seventh heat exchanger 172 substituting the sixth heat exchanger 17 is arranged in the air conditioner box. In this way, the thermal management system includes the first heat exchange system, the second heat exchange system and the third heat exchange system, and the fourth heat exchanger 21 and the seventh heat exchanger 171 through which the coolant flows are arranged in the air conditioning box, which prevents the refrigerant from flowing into the passenger compartment and helps to improve safety.

The thermal management system has a circulation mode in which the first heat exchange system is in communication with the second heat exchange system through the first communication pipeline 51 and the second communication pipeline 52. The first heat exchange system is in communication with the second heat exchange system, which includes that the coolant in the first heat exchange system converges into the second heat exchange system through the second communication pipeline 52, and the mixed coolant in the second exchange system flows into the first heat exchange system through the first communication pipeline 51, which also includes that the coolant in the second heat exchange system converges into the first heat exchange system through the first communication pipeline 51, and the mixed coolant in the first heat exchange system converges into the second heat exchange system through the second communication pipeline 52. In the circulation mode, regardless of a working condition of a refrigerant system, as long as the coolant in the first heat exchange system and the coolant in the second heat exchange system are exchanged, the thermal heat management system is in the circulation mode. In the circulation mode, the first pump 22 and the second pump 32 may be turned on, the first valve member 25 and/or the second valve member may be opened, the coolant in the first heat exchange system converges into the second heat exchange system through the second communication pipeline 52, and the coolant in the second heat exchange system converges into the first heat exchange system through the first communication pipeline 51.

In some cases, the thermal management system needs to cool or heat the device such as the battery, and thereby enters a first circulation mode. When the external ambient temperature is not too low and the temperature requirement of the passenger compartment is not high or unnecessary, the compressor 10 is closed, or in other words, there is no heat exchange between the refrigerant and the coolant, the first pump 22 and/or the second pump 32 are turned on, the first valve member 25 and/or the second valve member are opened, the first communication pipeline 51 and the second communication pipeline 52 are opened, and, driven by the first pump 22 and/or the second pump 32, the heat of the device such as the battery enters the first heat exchange system through the first communication pipeline 51, the coolant in the first heat exchange system flows into the fourth heat exchanger 21, and the fourth heat exchanger 21 releases heat to the airflow in the air duct to heat the passenger compartment. If the heat requirement of the thermal management system increases, the heating device is turned on, and the temperature of the discharge air can be adjusted by adjusting the power of the heating device. In the first circulation mode, the refrigerant system is turned off, the heat of the device such as the battery enters the first heat exchange system through the first communication pipeline 51 or the second communication pipeline 52, and the heat is released to the passenger compartment by the fourth heat exchanger 21, which is beneficial to saving energy. If the temperature of the device such as the battery is low and needs to be increased, the thermal management system opens the first communication pipeline 51 and the second communication pipeline 52, and closes the temperature damper 211, one portion of the coolant in the first heat exchange system enters the second heat exchange system, and after the coolant in the first heat exchange system is mixed with the coolant in the second heat exchange system, one portion of the mixed coolant enters the fifth heat exchanger 31 and heats the device such as the battery, and another portion of the mixed coolant enters the first heat exchange system through the first communication pipeline 51, thereby mixing with the coolant in the first heat exchange system. The process cycles in such a way. In the first circulation mode of the thermal management system, when the device such as the battery requires the heat of the first heat exchange system, a heat source of the coolant in the first heat exchange system may be the heating of the heating device 23, or the heat pumped by the refrigerant system from the external environment through the third heat exchanger 13, or the heat released by the heating device 23 and the refrigerant system to the first heat exchange system. When the refrigerant system pumps heat from the external environment through the third heat exchanger 13, the compressor 10 is turned on, the second valve device 16 opens the communication channel between the refrigerant outlet of the first flow channel of the first heat exchanger and another port of the third heat exchanger 13, the first throttle device 152 is turned on, the second throttle device 151 is turned off, and the temperature damper 211 is closed. If the heat cannot meet the heat requirement of the device such as the battery, the heating device 23 is turned on to enhance the heat.

If the passenger compartment needs to be heated and dehumidified, while the temperature of the device such as the battery is low, the device such as the battery needs to be heated, and the thermal management system enters a second circulation mode. In this case, the second valve device 16 is controlled to be in the first working state, the temperature damper 211 is opened and the first pump 22 is turned on, the refrigerant outlet of the first flow channel of the first heat exchanger 11 is in communication with the second port of the third heat exchanger 13, the first throttle device 152 is turned on, and the second throttle device 151 is turned off. Specifically, the refrigerant becomes a high-temperature and high-pressure gas after being compressed by the compressor 10, the refrigerant discharged by the compressor 10 enters the first heat exchanger 11, the temperature damper 211 is opened, the first pump 22 and the second pump 32 are turned on, the first valve member 25 and/or the second valve member are opened, the refrigerant exchanges heat with the coolant in the first heat exchanger system at the first heat exchanger 11, the coolant in the first heat exchanger system releases heat at the fourth heat exchanger 21, then the coolant in the first heat exchange system enters the second heat exchange system through the second communication pipeline 52 to heat the device such at the battery, and the coolant then enters the first heat exchange system through the first communication pipeline 51 to exchange heat with the refrigerant in refrigerant system at the first heat exchanger. The refrigerant enters the third heat exchanger 13 through the second valve device 16, the refrigerant exchanges heat with the air around the third heat exchanger 13, releases heat to the surrounding air, and becomes a low-temperature and high-pressure refrigerant. After being throttled by the first throttle device 152, the refrigerant enters the sixth heat exchanger 17, and at this time, the refrigerant exchanges heat with the surrounding air at the sixth heat exchanger 17, absorbs heat from the surrounding air, and cools and dehumidifies the air around the sixth heat exchanger 17. The water vapor in the air condenses when it hits a low temperature, and the object of dehumidification is thereby achieved. At this time, the temperature damper 211 in front of the fourth heat exchanger 21 of the air conditioning box is opened or partially opened, the airflow is first cooled and dehumidified by the sixth heat exchanger 17 and becomes a low-temperature and low-humidity airflow, and then the low-humidity airflow is heated by the fourth heat exchanger 21. The heated airflow enters the vehicle interior through the grille and realizes the function of dehumidifying the vehicle interior.

If the passenger compartment needs to be heated, while the temperature of the device such as the battery is low, the device such as the battery need to be heated, and the thermal management system enters a third circulation mode. In the third circulation mode of the thermal management system, the compressor 10 is closed, the first pump 22 and the second pump 32 are turned on, the heating device is turned on, the first valve member 25 is opened, the temperature damper 211 is opened, the heated coolant in the first heat exchange system enters the second heat exchange system through the first communication pipeline 51 or the second communication pipeline 52, thereby increasing the temperature of the coolant in the second heat exchange system and heating the passenger compartment and the device such as the battery; or the thermal management system heats the passenger compartment and the device such as the battery in the following manner, the compressor 10, the first pump 22, the second pump 32 and the first valve member 25 are turned on, the temperature damper 211 is opened, the second valve device 16 enters the second working state, the first communication port 1601 communicates with the third communication port 1603, the first throttle device 152 is turned on, and the third heat exchanger 13 functions as an evaporator to absorb heat from the surrounding air.

The thermal management system further has a heating mode, a refrigeration mode and a dehumidification mode. The heating mode, the refrigeration mode and the dehumidification mode do not include the case in which the first heat exchange system exchanges the coolant with the second heat exchange system, or in other words, in the heating mode or the refrigeration mode or the dehumidification mode, the first heat exchange system does not exchange the coolant with the second heat exchange system. In the heating mode, the first throttle device 152 and/or the second throttle device 151 are turned on, the low-temperature and low-pressure refrigerant in the thermal management system is compressed into a high-temperature and high-pressure by the compressor 10, the refrigerant from an outlet end of the compressor 10, flowing through the first flow channel of the first heat exchanger 11, enters the first heat exchanger 11. At this time, the temperature damper 211 is opened, the first pump 22 is turned on, the refrigerant in the first flow channel of the first heat exchanger 11 exchanges heat with the coolant in the first heat exchange system at the first heat exchanger 11, and the refrigerant in the first flow channel of the first heat exchanger 11 releases heat to the coolant in the first heat exchange system after the heat exchange. The second valve device 16 is in the second working state, the first communication port 1601 is in communication with the second communication port 1602, the third communication port 1603 is in communication with the fourth communication port 1604, and the refrigerant releases heat again at the sixth heat exchanger 17. The refrigerant flowing out of the first flow channel of the first heat exchanger 11 is throttled and depressurized by the second throttle device 151 and/or the first throttle device 152, and the throttled and depressurized refrigerant flows into the third heat exchanger 13 and/or the first flow channel of the second heat exchanger 12. The refrigerant flowing into the third heat exchanger 13 exchanges heat with the air around the third heat exchanger 13 and absorbs heat from the air around the third heat exchanger 13. A fan 131 arranged close to the third heat exchanger 13 blows the air around the third heat exchanger 13 to form an airflow, thereby accelerating the heat exchange between the third heat exchanger 13 and the surrounding air and accelerating the absorption of air heat. The refrigerant flowing into the first flow channel of the second heat exchanger 12 exchanges heat with the coolant in the second heat exchange system at the second heat exchanger 12 and absorbs heat from the coolant in the second heat exchange system. The heat of the second heat exchanger system is mainly released by the device such as the battery. The device such as the battery exchanges heat with the coolant in the fifth heat exchanger 31, and the coolant in the fifth heat exchanger 31 absorbs heat of the device such as the battery.

In addition, if the heat still fails to meet the requirements, the heating device 23 is turned on. The heating device 23 releases heat to the coolant in the first heat exchange system to increase the heat released by the fourth heat exchanger 21; the temperature damper 211 may be closed and the first pump 22 is turned off. At this time, the airflow in the air duct bypasses the fourth heat exchanger 21, the fourth heat exchanger 21 does not participate in the heat exchange, and only the sixth heat exchanger 17 releases heat to the passenger compartment. In addition, in the heating mode of the thermal management system, the second valve device 16 may be in the first working state, that is, the first communication port 1601 is in communication with the third communication port 1603, and the second communication port 1602 is in communication with the fourth communication port 1604. At this time, the first pump 22 is turned on, and the temperature damper 211 is opened, the fourth heat exchanger 21 releases heat, the third heat exchanger 13 releases heat as the condenser, the first throttle device 152 is turned off, the second throttle device 151 is turned on, the second heat exchanger 12 absorbs the heat of the coolant as the evaporator, no refrigerant flows in the sixth heat exchanger 17, and the sixth heat exchanger does not participate in the heat exchange. In the heating mode of the thermal management system, the first valve member 25 is closed, and the first heat exchange system does not exchange the coolant with the second heat exchange system.

When the relative humidity of the passenger compartment is relatively high, the water vapor in the air is easy to condense on the window glass to affect the visual field, which poses a potential safety hazard. Therefore, the air in the passenger compartment needs to be dehumidified, which corresponds to the dehumidification mode of the thermal management system. When the temperature is low and the heating requirement is large, the dehumidification mode is activated. In the dehumidification mode, the temperature damper 211 is opened, the first pump 22 is turned on, the second valve device 16 is controlled to be in the first working state, the refrigerant outlet of the first flow channel of the first heat exchanger 11 is in communication with the second port of the third heat exchanger 13, the first throttle device 152 is turned on, or the second throttle device 151 and the first throttle device 152 are turned on at the same time. Specifically, the refrigerant becomes the high-temperature and high-pressure gas after being compressed by the compressor 10, and the refrigerant discharged by the compressor 10 enters the first flow channel of the first heat exchanger 11. At this time, the temperature damper 211 is opened and the first pump 22 is turned on, the high-temperature and high-pressure refrigerant exchanges heat with the coolant in the second flow channel at the first flow channel of the first heat exchanger 11 to release heat to the coolant in the first heat exchange system. Driven by the first pump 22, the coolant in the first heat exchange system flows to the fourth heat exchanger 21, and the coolant releases heat to the surrounding air at the fourth heat exchanger 21 to heat the airflow. The refrigerant in the first flow channel of the first heat exchanger 11 flows into the third heat exchanger 13 through the second valve device 16, and releases heat again at the third heat exchanger 13, and then enters the first port of the first valve device 15 and enters the first throttle device 152, respectively, or the refrigerant enters the second throttle device 151 and the first throttle device 152 at the same time. The refrigerant is throttled and depressurized by the first throttle device 152 to become a low-temperature and low-pressure medium. The low-temperature and low-pressure refrigerant exchanges heat with the surrounding air at the sixth heat exchanger 17 and absorbs heat from the surrounding air. Since the humidity of a surface of the sixth heat exchanger 17 is low, the water vapor in the air condenses, and the air is cooled and dehumidified. The refrigerant flowing through the sixth heat exchanger 17 enters the suction port of the compressor 10 through the gas-liquid separator 14. Similarly, the refrigerant is throttled and depressurized by the second throttle device 151 and becomes the low-temperature and low-pressure medium. The low-temperature and low-pressure refrigerant exchanges heat with the coolant in the second flow channel at the first flow channel of the second heat exchanger 12, absorbs heat from the coolant, becomes a low-temperature and low-pressure refrigerant, and can enter the suction port of the compressor 10 through the gas-liquid separator 14. The refrigerant becomes the low-temperature and low-pressure medium after being throttled and depressurized by the second throttle device 151. At this time, the second pump 32 is turned on, and driven by the second pump 32, the coolant in the coolant system flows in the coolant system, the refrigerant absorbs the heat of the heat exchange medium in the coolant system, and the coolant cooled in the second heat exchange system cools the device such as the battery at the fifth heat exchanger 31. If the temperature of the device such as the battery is lower than its operating temperature at this time, the second throttle device 151 can be controlled to be turned off.

When the temperature in the passenger compartment is relatively high and needs to be lowered to improve comfort, the thermal management system enters the refrigeration mode. In the refrigeration mode, the refrigerant becomes a high-temperature and high-pressure refrigerant after being compressed by the compressor 10, the refrigerant discharged by the compressor 10 enters the first flow channel of the first heat exchanger 11, and the temperature damper 211 of the fourth heat exchanger 21 is closed and/or the first pump 22 is turned off. The fourth heat exchanger 21 hardly participates in the heat exchange, and the second valve device 16 is controlled to be in the first working state. The refrigerant discharged from the first flow channel of the first heat exchanger 11 enters the second port of the third heat exchanger 13 through the second valve device 16. The refrigerant exchanges heat with the surrounding air at the third heat exchanger 13, releases heat to the surrounding air, and becomes a low-temperature and high-pressure refrigerant. The refrigerant cooled by the third heat exchanger 13 passes through the one-way element and is throttled by the first throttle device 152, and then enters the sixth heat exchanger 17. The refrigerant in the sixth heat exchanger 17 absorbs heat from the airflow, or in other words, the refrigerant cools the surrounding air at the sixth heat exchanger 17, and the second throttle device 151 is turned off at this time. In addition, when both the passenger compartment and the device such as the battery need to be cooled, the refrigerant discharged from the first port of the third heat exchanger 13 enters the first flow channel of the second heat exchanger 12 and the sixth heat exchanger 17, the first throttle device and the second throttle device are turned on, the refrigerant flowing through the sixth heat exchanger 17 is throttled and depressurized by the first throttle device 152, and exchanges heat with the surrounding airflow at the sixth heat exchanger 17, absorbing heat and lowering the temperature of the airflow. The refrigerant flowing through the second heat exchanger 12 exchanges heat with the coolant in the coolant system after being throttled and depressurized by the second throttle device 151, to lower the temperature of the coolant. The cooled coolant exchanges heat with the device such as the battery at the fifth heat exchanger 31 to lower the temperature of the device such as the battery.

Compared with the conventional technology, the thermal management system of the present application at least includes the first heat exchange system and the second heat exchange system, and the communication channel is provided between the first heat exchange system and the second heat exchange system to realize the coolant exchange between the first heat exchange system and the second heat exchange system, which is beneficial to the energy saving of the thermal management system.

It should be noted that, the description of the above embodiments is only used to illustrate the present application and is not intended to limit the technical solutions of the present application, such as the definitions of "front", "rear", "left", "right", "up", and "down". Although the present application is described in detail with reference to the above embodiments, it should be understood by those skilled in the art that, various combinations, modifications and equivalents can be made to the technical solutions of the present application without departing from the spirit and scope of the present application, all of which are intended to fall within the scope of the claims of the present application.

The invention claimed is:

1. A thermal management system, comprising a refrigerant system, a first heat exchange system, and a second heat exchange system, wherein the thermal management system comprises a first heat exchanger, a second heat exchanger and a third heat exchanger, both the first heat exchanger and the second heat exchanger comprise a first flow channel and a second flow channel, the first flow channel and the second flow channel of the first heat exchanger are isolated from each other and are not in communication with each other, and the first flow channel and the second flow channel of the second heat exchanger are isolated from each other and are not in communication with each other;

the refrigerant system comprises a first flow channel of the first heat exchanger and a first flow channel of the second heat exchanger; the first heat exchange system comprises a fourth heat exchanger and a second flow channel of the first heat exchanger, the second flow channel of the first heat exchanger is in communication with the fourth heat exchanger, and the first heat exchange system is configured to exchange heat with the refrigerant system at the first heat exchanger;

the second heat exchange system comprises a second flow channel of the second exchanger and a fifth heat exchanger, the second flow channel of the second heat exchanger is in communication with the fifth heat exchanger, and the second heat exchange system is configured to exchange heat with the refrigerant system at the second heat exchanger;

the thermal management system further comprises a first communication pipeline and a second communication pipeline, the thermal management system has a circulation mode in which a portion of a coolant of the first heat exchange system is configured to flow into the second heat exchange system and be mixed with a coolant of the second heat exchanger system, and the mixed coolant of the second heat exchange system is configured to flow into the first heat exchange system; and the thermal management system further comprises an air conditioning box, the fourth heat exchanger is arranged inside the air conditioning box, and the fifth heat exchanger is arranged outside the air conditioning box, wherein the thermal management system further comprises a first pump and a second pump, wherein the first pump and the fourth heat exchanger are in communication with the second flow channel of the first heat exchanger, the second pump and the fifth heat exchanger are in communication with the second flow channel of the second heat exchanger, a first connection port of the first communication pipeline is in communication with the first heat exchange system or is in communication with the first heat exchange system through the first pump, and the second connection port of the second communication pipeline is in communication with the second heat exchange system or is in communication with the second exchange system through the second pump;

wherein the thermal management system further comprises a first valve member, the first valve member comprises a first port and a second port, the first port of the first valve member is in communication with the first connection port of the first communication pipeline, and the second port of the first valve member is in communication with an inlet of the first pump or the second port of the first valve member is in communication with a pipeline of the second heat exchange system; the first valve member is configured to control whether a first port of the first valve member is in communication with a second port of the first valve member; wherein the thermal management system further includes a kettle arranged at a highest point of the first heat exchange system and the second heat exchange system, wherein the kettle includes a first connection port and a second connection port, and the first connection port is higher than the second connection port, the kettle is a part of a flow channel of a coolant system, and the coolant outlet of the fourth heat exchanger is in communication with the first connection port of the kettle, and the second connection port of the kettle is in communication with the inlet of the first pump through the second port of the first valve member, wherein the second connection port of the kettle is in communication with the pipeline between the fifth heat exchanger and the inlet of the second pump through the second communication pipeline.

2. The thermal management system according to claim 1, wherein the first heat exchange system further comprises a heating device, the heating device comprises two ports, a coolant flow channel communicating the two ports of the heating device and a heating core, the heating core is configured to heat the coolant flowing through the heating device, the heating device and the second flow channel of the first heat exchanger are in communication with the fourth heat exchanger, and the heating device is arranged outside the air conditioning box.

3. The thermal management system according to claim 1, wherein the refrigerant system further comprises a compressor and a first valve device, the first valve device comprises a first port, a second port and a third port, the second port of the first valve device is configured to communicate with the first port of the first valve device and/or the third port of the first valve device, an outlet of the compressor is in communication with a refrigerant inlet of the first flow channel of the first heat exchanger, a refrigerant outlet of the first flow channel of the first heat exchanger is configured to communicate with the second port of the first valve device, the first port of the third heat exchanger is configured to communicate with the first port of the first valve device, the refrigerant inlet of the first flow channel of the second heat exchanger is configured to communicate with the third port of the first valve device, the second port of the third heat exchanger is configured to communicate with a suction port of the compressor, and the refrigerant outlet of the first flow channel of the second heat exchanger is configured to communicate with the suction port of the compressor.

4. The thermal management system according to claim 3, wherein the thermal management system comprises a first throttle device and a second throttle device, a second connection port of the first throttle device and the second connection port of the second throttle device are in communication with the second port of the first valve device, a first connection port of the second throttle device is in communication with the third port of the first valve device, and the first connection port of the first throttle device is in communication with the first port of the first valve device.

5. The thermal management system according to claim 1, wherein the first pump and the fourth heat exchanger are in communication with the second flow channel of the first heat exchanger, a first connection port of the first communication pipeline is in communication with the first heat exchange system or is in communication with the first heat exchange system through the first pump, and a second connection port of the second communication pipeline is in communication with the second heat exchange system.

6. The thermal management system according to claim 1, wherein the second pump and the fifth heat exchanger are in communication with the second flow channel of the second heat exchanger, the first connection port of the first communication pipeline is in communication with the first heat exchange system, and the second connection port of the second communication pipeline is in communication with the second heat exchange system or is in communication with the second heat exchange system through the second pump.

7. The thermal management system according to claim 1, further comprising a first valve member, wherein the first valve member comprises three ports, the first valve member controls whether the first port of the first valve member is in communication with a third port of the first valve member, and/or the first valve member controls whether the first port is in communication with the second port, the first port of the first valve member is in communication with the first communication pipeline, the second connection port of the first communication pipeline is in communication with the second heat exchange system through the second port of the first valve member and the third port of the first valve member, or the second port of the first valve member is in communication with the inlet of the first pump, and the third port of the first valve member is in communication with a corresponding pipeline of the first heat exchange system.

8. The thermal management system according to claim 1, the thermal management further comprises a second valve member, the second valve member comprises two ports, the second valve member controls whether a first port of the second valve member is in communication with a second port of the second valve member, the first port of the second valve member is in communication with the second communication pipeline, and the second port of the second valve member is in communication with the pipeline of the second heat exchange system or the second port of the second valve member is in communication with the pipeline of the first heat exchange system; or the second valve member comprises three ports, the second valve member controls whether the first port of the second valve member is in communication with a third port of the second valve member, and/or the second valve member controls whether the first port of the second valve member is in communication with the second port of the second valve member, the first port of the second valve member is in communication with the second communication pipeline, the second communication pipeline is in communication with the first heat exchange system through the second port of the second valve member and the third port of the second valve member, or the second port of the second valve member is in communication with the inlet of the second pump, and the third port of the second valve member is in communication with the corresponding pipeline of the second heat exchange system.

* * * * *